H. J. WOODLEY.
ATTACHMENT FOR AUTOMOBILE FOOTBOARDS.
APPLICATION FILED MAR. 11, 1915.
1,185,458.
Patented May 30, 1916.
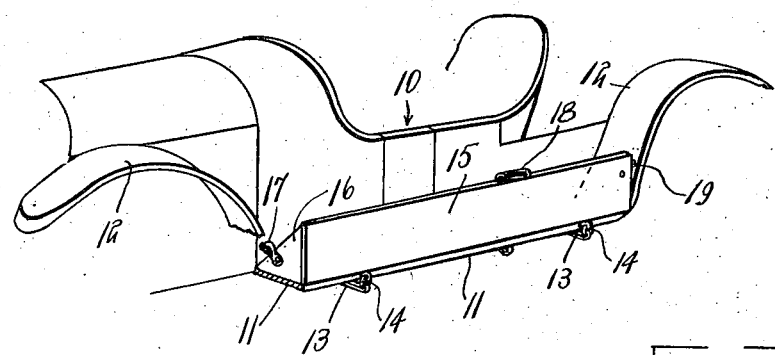
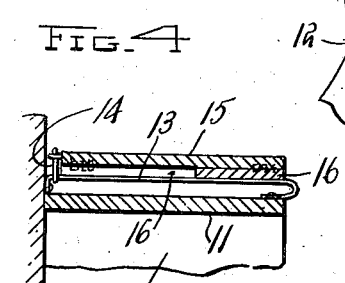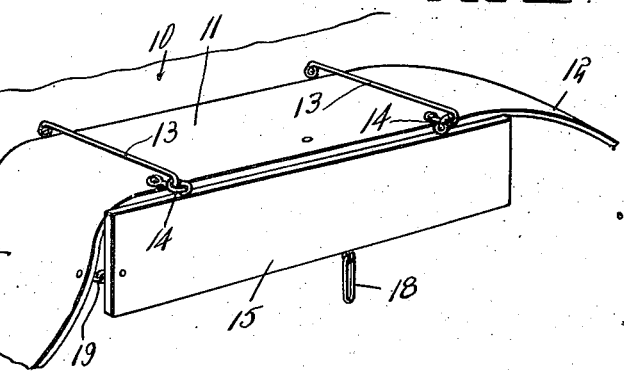
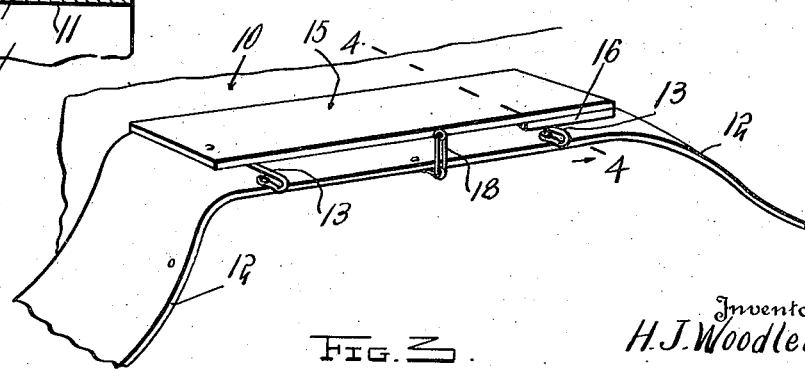
Inventor
H. J. Woodley

UNITED STATES PATENT OFFICE.

HENRY J. WOODLEY, OF SHAMROCK, TEXAS.

ATTACHMENT FOR AUTOMOBILE-FOOTBOARDS.

1,185,458.  Specification of Letters Patent.  Patented May 30, 1916.

Application filed March 11, 1915. Serial No. 13,664.

*To all whom it may concern:*

Be it known that I, HENRY J. WOODLEY, a citizen of the United States, residing at Shamrock, in the county of Wheeler, State of Texas, have invented certain new and useful Improvements in Attachments for Automobile-Footboards; and I do hereby declare the following to be a full, clear, and exact description of the invention, such as will enable others skilled in the art to which it appertains to make and use the same.

This invention relates to attachments for automobile foot boards.

The object of the invention is to provide a device of the character named so arranged in connection with a foot board of an automobile that same can be swung and secured along the outer edge of the foot board at right angles to the latter and thus produce a receptacle in conjunction with the foot board and body of the automobile for the reception of packages and the like, the arrangement of the device and the mounting thereof further providing for folding the same beneath the foot board when not in use.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view of a fragment of an automobile showing the attachment applied and arranged to form a receptacle for the reception of packages and the like; Fig. 2, a perspective view looking at the bottom of the foot board with the parts in the position shown in Fig. 1; Fig. 3, a view similar to Fig. 2 with the parts in folded position, and Fig. 4, a section on the line 4—4 of Fig. 3.

Referring to the drawings 10 indicates the body of the automobile, 11 the foot board and 12 the mud guards. Mounted on the underside of the foot board 11 transversely thereof and adjacent each end is a guide rod 13. Slidable on the guide rods 13 respectively are eye members 14 which are carried by a side board 15 whereby said side board may be swung to a position at right angles to the foot board 11 along the outer edge thereof or to a position against the underside of the foot board as shown in Fig. 3. Hinged to one end of the side board 15 is a member 16 carrying a fastening device 17 adapted to be engaged with the foot board 11 to support the side board 15 in vertical position. When the side board is secured in vertical position the member 16 is disposed at right angles to the side board and when the side board is disposed in the position shown in Fig. 3 the member 16 is folded between the side board and the foot board. The side board 15 carries a fastening device 18 on its free edge, said device being adapted to engage the foot board when the side board is in folded position to support the free edge of said side board as will be obvious. The end of the side board 15 remote from the member 16 carries a fastening device 19 adapted to engage the adjacent mud guard 12 to assist in holding the side board 15 in vertical position.

What is claimed is:—

The combination with the foot board of an automobile, of transverse guide bars secured to the underside of the foot board, a side board, eye members carried by the side board and slidably engaged on the guide bars whereby said side board may be swung to a position at right angles to the foot board along the outer edge of the latter and to a position folded against the underside of the foot board, means for securing the side board in vertical position, and means for securing the side board in folded position.

In testimony whereof, I affix my signature, in the presence of two witnesses.

HENRY J. WOODLEY.

Witnesses:
R. B. BONNER,
JAMES B. CLARK.